March 17, 1953  G. W. HARDER ET AL  2,631,806
BUMPER CLAMP
Filed Aug. 19, 1949
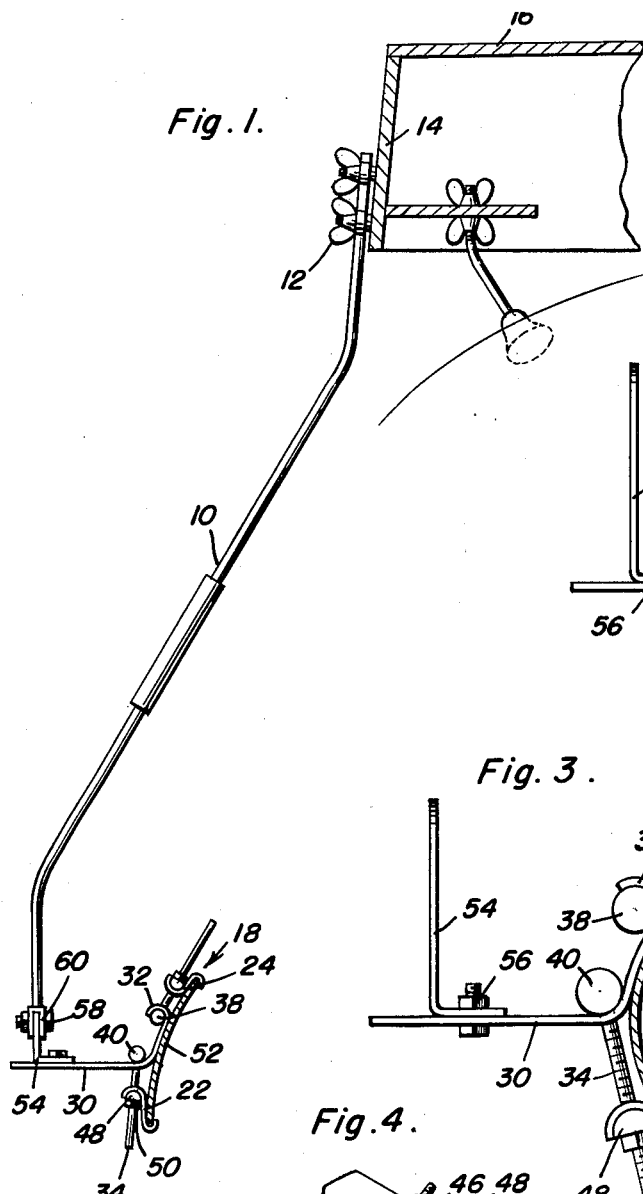
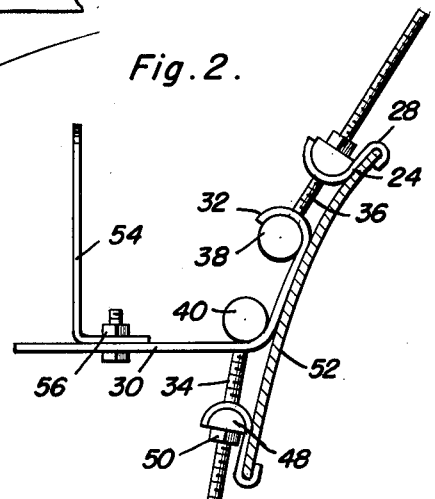
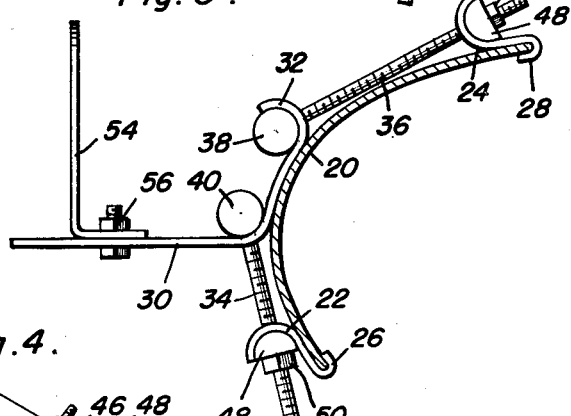
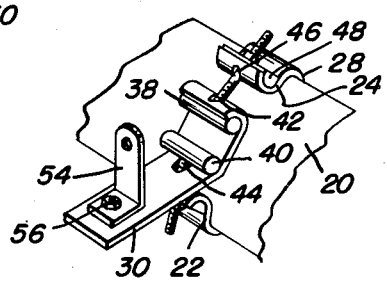
George W. Harder
William D. Wuest
INVENTORS
BY *Clarence A. O'Brien*
*and Harvey B. Jackson*
Attorneys

UNITED STATES PATENT OFFICE 2,631,806

BUMPER CLAMP

George W. Harder and William D. Wuest, Louisville, Ky.

Application August 19, 1949, Serial No. 111,196

1 Claim. (Cl. 248—226)

This invention relates to a bumper clamp or bracket and has for its primary object to attach objects to various types of vehicle bumpers, regardless of the configuration or size and cross section of the bumper.

Another important object of this invention is to form an adjustable support for a boat loading device, similar to that disclosed in Patent 2,248,591, issued on September 7, 1948, to George W. Harder.

These and ancillary objects and structural features of merit are attained by this invention, a preferred embodiment of which is set forth in the following description and illustrated in the accompanying drawings, wherein:

Figure 1 is an enlarged side elevational view of a boat supporting arm, with the boat shown in section and with one embodiment of this invention shown in elevation, as attached to a vehicle bumper;

Figure 2 is an enlarged side elevational view of the embodiment of this invention;

Figure 3 is a similar side elevational view, illustrating the adaptability of this invention to various types of bumpers, and, Figure 4 is a view in perspective of this invention.

This invention appertains to a bumper bracket or clamp, which can be easily attached to any type of vehicle bumper and which will provide a support or trailer hitches, luggage, or similar equipment. However, the main function of the bumper clamp is to support a boat loading device, the boat loading device consisting of front and rear arms connected to the bumper clamp, which is detachably secured to the front and rear bumpers of a vehicle. The upper ends of the arms are secured to the bow and stern of a boat, the arms being adapted to raise the boat onto the top of the vehicle and to swing the boat downwardly, so that the same may be removed from a carrying position in a convenient manner.

With respect to Figure 1, the numeral 10 designates one of the front or rear supporting arms, which is constructed from tubing or the like, the upper end of the arms being secured by bolt assemblies 12 to the transom 14 of a conventional boat 16. This construction is specifically taught in the above mentioned patent.

This invention generally designated by the numeral 18 is adapted to support the arm 10 and is designed to be easily attached to any type of vehicle bumper 20. The bumper clamp 18 includes a pair of U-shaped plates 22 and 24, which are provided with integral inturned clamping ends 26 and 28, the latter being adapted to engage on the upper and lower edges of the bumper. A support plate 30 of substantially right angular configuration is provided, the vertical portion of the support plate terminating in a U-shaped end 32. A pair of elongated threaded bolts 34 and 36 are provided and are formed with transversely disposed rod-like heads 38 and 40. The bolt 36 is disposed through an elongated slot 42 formed in the end 32 of the vertical section of the supporting plate and the bolt 34 is disposed through a similar slot 44 formed at the angular junction between the horizontal section and vertical section of the supporting plate. It is to be noted that the heads 38 and 40 of the bolts conform to the angular bends in the plate and thereby securely anchor the one end of the bolts to the supporting plate. Both of the U-shaped clamping plates 22 and 24 are formed with longitudinally disposed elongated slots 46 through which the threaded shank of the bolt passes. U-shaped spacers or washers 48 are cradled in the U-shaped plate and locking nuts 50 are threaded on the bolts and abut against the flat side wall of the spacers. Thus, with the hook ends 26 and 28 of the clamping plate disposed on the edges of the bumper, it can be seen that the supporting plate is securely attached to the bumper by means of the bolts 34 and 36. With respect to Figures 2 and 3, the adjustability of the construction can be appreciated, the difference between the configuration or cross section of the bumper 20 in Figure 3 and the bumper 52 in Figure 2 being noted. However, the bumper clamp can be easily secured on either of the bumpers, due to the elongated slots in the clamping plate and in the supporting plate and the rod-like heads and spacers associated with the bolts. An L-shaped member 54 is seated on and securely bolted as at 56 to the extending end of the horizontal section of the supporting plate and is formed with an upper perforated end. The tubular arm 10 terminates at its lower end in a bifurcated extremity 56 which is received on the upper end of the member 54 and pivotally secured thereto as at 58.

It can thus be seen that a strong and efficient bumper bracket is provided, which is detachably and adjustably secured to a vehicle bumper mainly for the purpose of supporting a boat loading device but, which can be used to form a dependable support for luggage and similar objects.

However, while one embodiment of this invention has been shown, it is to be understood that certain other embodiments can be carried out, as coming within the spirit and scope of the appended claim.

Having described the invention, what is claimed as new is:

A supporting clamp for detachably mounting a supporting plate on a vehicle bumper of arcuated form comprising a pair of clamping hooks of S-shaped cross-section having hook ends receivable on the upper and lower edges of said bumper, a support plate of substantially right angular configuration having the substantially vertically extending portion terminating in a U-shaped end, an intermediate portion of said supporting plate being arcuated between the angulated portions, elongated slots formed in the U-shaped end and arcuated portion of the supporting plate, each of said clamping hooks being formed with a longitudinally disposed slot medial of the inner arcuated portion thereof, elongated bolts disposed through said slots and having arcuately contoured heads disposed in said U-shaped end and arcuated portion, the outer threaded ends of said bolts slidably receiving arcuately contoured bars disposed in abutment with the inner arcuated portions of said clamping hooks, and nuts adjustably received on the outer ends of said bolts for securely positioning said supporting plate in a preselected plane.

GEORGE W. HARDER.
WILLIAM D. WUEST.

REFERENCES CITED

The following references are of record in the file of this patent:

UNITED STATES PATENTS

| Number | Name | Date |
| --- | --- | --- |
| 1,138,964 | Loungley | May 11, 1915 |
| 1,662,539 | Schmidt | Mar. 13, 1928 |
| 1,861,148 | Withrow | May 31, 1932 |
| 2,266,715 | Parrott | Dec. 16, 1941 |
| 2,379,994 | Schwinn | July 10, 1945 |
| 2,432,249 | Pearson | Dec. 9, 1947 |
| 2,549,100 | Kershaw | Apr. 17, 1951 |